United States Patent
Liu et al.

(10) Patent No.: US 11,443,448 B2
(45) Date of Patent: Sep. 13, 2022

(54) INCOHERENT DIGITAL HOLOGRAPHY BASED DEPTH CAMERA

(71) Applicant: Samsung Electronics Company, Ltd., Suwon si (KR)

(72) Inventors: Changgeng Liu, San Jose, CA (US); Ernest Rehmatulla Post, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 16/983,995

(22) Filed: Aug. 3, 2020

(65) Prior Publication Data
US 2021/0166409 A1    Jun. 3, 2021

Related U.S. Application Data

(60) Provisional application No. 62/943,006, filed on Dec. 3, 2019.

(51) Int. Cl.
*G06T 7/557*    (2017.01)
*G06F 16/901*    (2019.01)
*G06T 7/586*    (2017.01)

(52) U.S. Cl.
CPC .......... *G06T 7/557* (2017.01); *G06F 16/9017* (2019.01); *G06T 7/586* (2017.01)

(58) Field of Classification Search
CPC ....... G06F 16/9017; G06T 2207/20021; G06T 7/557; G06T 7/571; G06T 7/586
See application file for complete search history.

(56) References Cited

U.S. PATENT DOCUMENTS

| | | | |
|---|---|---|---|
| 4,156,571 A * | 5/1979 | Ljung | H01S 3/1398 250/206 |
| 6,809,845 B1 | 10/2004 | Kim | |
| 9,417,610 B1 | 8/2016 | Kim | |
| 9,507,321 B2 | 11/2016 | Tsang | |
| 2013/0100333 A1* | 4/2013 | Awatsuji | H04N 5/2256 348/335 |
| 2014/0320942 A1* | 10/2014 | Rosen | G03H 1/041 359/11 |
| 2015/0201121 A1* | 7/2015 | Nobayashi | H04N 5/3696 348/222.1 |

(Continued)

OTHER PUBLICATIONS

Greene, Tristan, "Apple introduces "Face ID" for iPhone X," Sep. 12, 2017 in Apple Special Event Sep. 2017, https://thenextweb.com/apple/2017/09/12/apple-introduces-face-unlock-feature-with-iphone-8-and-iphone-x/, 3 pages.

(Continued)

*Primary Examiner* — Ming Wu

(57) ABSTRACT

A method includes capturing light reflected off one or more objects and splitting the captured light into a plurality of light fields with a plurality of phase curvatures. The method further includes generating, for the one or more objects, a plurality of holograms based on the plurality of light fields and determining, for each of the plurality of holograms, an intensity and a phase-shift of the hologram. The method thus includes generating a depth map comprising depth information for the one or more objects based at least in part on a function determined by the respective phase-shifts of the plurality of holograms.

17 Claims, 12 Drawing Sheets

(56) References Cited

U.S. PATENT DOCUMENTS

| | | | | |
|---|---|---|---|---|
| 2015/0264335 | A1* | 9/2015 | Park | G02B 7/08 |
| | | | | 348/49 |
| 2016/0109851 | A1* | 4/2016 | Tsang | G03H 1/0866 |
| | | | | 359/9 |
| 2017/0162221 | A1* | 6/2017 | Shigaki | G11B 7/0045 |
| 2018/0344153 | A1* | 12/2018 | Svetliza | G02B 6/28 |

OTHER PUBLICATIONS

Mutto, Carlo Dal, et al., "Time of Flight Cameras and Microsoft Kinect™", SpringerBriefs in Electrical and Computer Engineering, http://www.springer.com/series/10059, ISBN 978-1-4614-3807-6 (eBook), DOI 10.1007/978-1-4614-3807-6, © The Author(s) 2012, Library of Congress Control No. 2012935106, 1-108 pages (115 pages.), Dec. 2011.

Makowski, Michal, "Experimental Aspects of Holographic Projection with a Liquid-Crystal-on-Silicon Spatial Light Modulator," Warsaw University of Technology, Warsaw, Poland, IntechOpen, ("Haneda", Team Tech/2016-3/18, POIR.04.04.00-00-3DD9/16-00). DOI: http://dx.doi.org/10.5772/intechopen.85118, 1-24 pages, Mar. 9, 2019.

Geng, Jason, "Structured-light 3D Surface Imaging: A Tutorial," IEEE Intelligent Transportation System Society, 11001 Sugarbush Terrace, Rockville, Maryland 20852. Published Mar. 31, 2011, (Doc. ID 134160), OCIS codes: 150.6910, 110.6880. Advances in Optics and Photonics 3, pp. 128-160 (2011), DOI:10.1364/AOP.3.000128, 1943-8206/11/020128-33 © OSA (33 pages).

Horaud, Radu, et al., "An Overview of Depth Cameras and Range Scanners Based on Time-of-Flight Technologies," Machine Vision and Applications Journal, Springer Verlag, 2016, 27 (7), pp. 1005-1020. 10.1007/s00138-016-0784-4, HAL ID: hal-01325045, https://hal.inria.fr/hal-01325045, submitted Jun. 1, 2016 (18 pages).

Rosen, Joseph and Brooker, Gary, "Digital Spatially Incoherent Fresnel Holography," Article in Optics Letters vol. 32, No. 8, Apr. 15, 2007, DOI: 10.1364/0L.32.000912, https://www.researchgate.net/publication/4632570, OCIS codes: 090.0090, 090.1970, 070.4550, 110.6880, 100.3010, 050.1950, 0146-9592/07/080912-3, © 2007 Optical Society of America, pp. 912-914 (4 pages).

Kim, Myung K., "Incoherent Digital Holographic Adaptive Optics," OCIS codes: 110.1080, 090.1995, 350.1260, Applied Optics, vol. 52, No. 1, pp. A117-A130, Jan. 1, 2013, 1559-128X/13/01A117-14 © 2013 Optical Society of America (14 pages).

Kim, Myung K., "Full Color Natural Light Holographic Camera," © 2013 Optical Society of America, OCIS codes: (090.1705) Color holography; (090.1995) Digital holography; (110.6880) Three-dimensional image acquisition, #185997 © 2013 OSA, Optics Express published Apr. 11, 2013, Apr. 22, 2013, vol. 21, No. 8, DOI:10.1364/OE.21.009636, pp. 9636-9642 (7 pages).

Schnars, Ulf and Jüptner, Werner P. O., "Direct Recording of Holograms by a CCD Target and Numerical Reconstruction," 0003-6935/94/020179-03 © 1994 Optical Society of America, Applied Optics, Jan. 10, 1994, vol. 33, No. 2, pp. 179-181 (3 pages).

Goodman, Joseph, "Introduction to Fourier Optics," Second Edition, Book Cover and Table of Contents, McGraw-Hill Companies, Inc., 1996, 7 pages, 1996.

International Search Report and Written Opinion for International Application No. PCT/KR2020/016173, dated Jan. 29, 2021.

Yoshikawa, "Phase determination method in statistical generalized phase-shifting digital holography", Applied Optics vol. 52, Issue 9, pp. 1947-1953, (https://scihub.wikicn.top/10.1364/AO.52.001947), Mar. 20, 2013.

* cited by examiner

INCOHERENT DIGITAL HOLOGRAPHY BASED DEPTH CAMERA

PRIORITY

This application claims the benefit under 35 U.S.C. § 119(e) of U.S. Provisional Patent Application No. 62/943,006, filed 3 Dec. 2019, which is incorporated herein by reference.

TECHNICAL FIELD

This disclosure relates generally to depth cameras, and, more particularly, to incoherent digital holography based depth cameras.

BACKGROUND

Certain cameras, such as depth cameras are utilized to perform facial recognition, human computer interaction, interactive gaming, robotic navigation, gesture recognitions, autonomous driving, and so forth. Some typical depth cameras may rely on time-of-flight (TOF) sensors emitting a light onto an object and detecting the time it takes to receive a reflection of the light to measure depth. Other typical depth cameras may rely on a projector projecting structured light into a scene and determining depth based on lighted reflected from an object in the scene as detected at 2 separate cameras. Indeed, the TOF sensors may utilize complex and power-intensive laser pulse illumination to detect the time delay. Similarly, as the structured light relies on complex projectors projecting a particular structured light pattern on an entire scene, the detectable depth range may be undesirably limited. It may be thus useful to provide techniques to improve depth cameras.

DESCRIPTION OF EXAMPLE EMBODIMENTS

Figure 1:
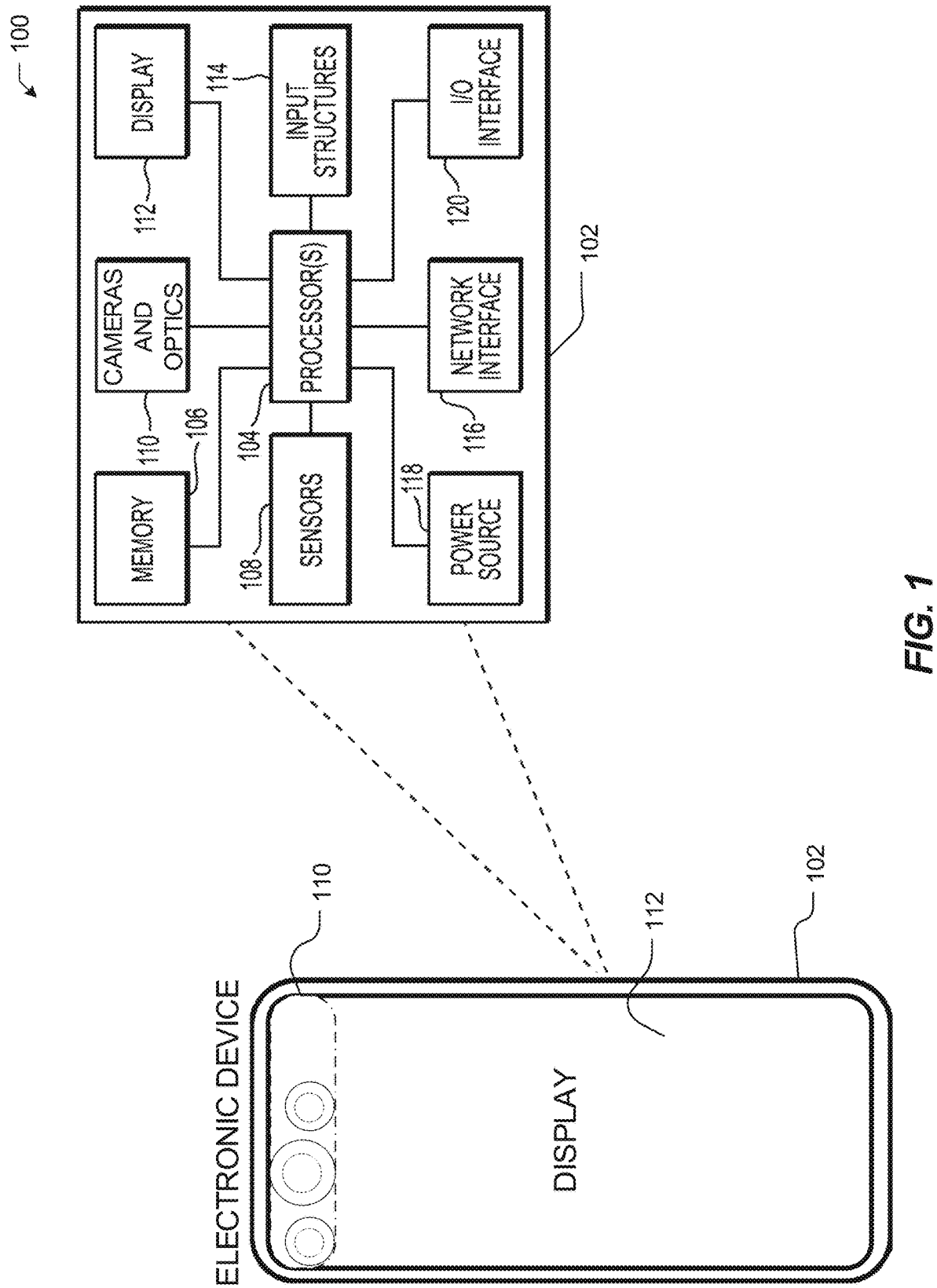
FIG. 1 illustrates an example electronic device.

The present embodiments are directed toward generating a depth map based on incoherent digital holography. In particular embodiments, an electronic device may capture light reflected off one or more objects within a real-world scene. For example, in particular embodiments, the electronic device may capture ambient light reflected off the one or more objects. In particular embodiments, the electronic device may then split the captured light into a number of light fields with a number of phase curvatures. In particular embodiments, the electronic device may split the captured light into the number of light fields by utilizing a spatial light modulator (SLM) of the electronic device. In particular embodiments, the SLM may split the captured light into a planar light wave and a spherical light wave. The electronic device may then generate, for the one or more objects, a number of holograms based on the plurality of light fields. In particular embodiments, the electronic device may generate, for each object of the one or more objects, a number of phase-shifted holograms, in which each phase-shifted hologram may include a phase shift of $\pi/2$ radians (e.g., 90°) with respect to each other.

In particular embodiments, the electronic device may then determine, for each of the number of holograms, an intensity and a phase-shift of the hologram. The electronic device may then generate a depth map comprising depth information for the one or more objects based at least in part on a function determined by the respective phase-shifts of the number of holograms. For example, in particular embodiments, to generate a depth map comprising depth information for the one or more objects, the electronic device may generate a complex function corresponding to the number of phase-shifted holograms. In particular embodiments, for each object of the one or more objects, the electronic device may determine a first reconstruction distance based at least in part on a position of the object or the complex function and determine a range between the first reconstruction distance and the position of the object. In particular embodiments, the electronic device may then numerically or digitally refocus a set of image frames of the object at a number of different reconstruction distances within the range. In particular embodiments, the electronic device may then generate a look-up table based on the position and the number of different reconstruction distances.

In particular embodiments, the electronic device may then divide each of the set of image frames into a number of image patches, and may then determine a particular reconstruction distance of the number of different reconstruction distances. In particular embodiments, the particular reconstruction distance may correspond to a maximizing of a focus evaluation function corresponding to one or more of the number of image patches. In particular embodiments, the electronic device may then determine a depth value associated with the object based at least in part on the look-up table, in which the depth value may correspond to the particular reconstruction distance. In particular embodiments, the electronic device may then assign the depth value to the one or more of the number of image patches to generate the depth map. Thus, the present techniques may utilize incoherent digital holography to generate a depth map based on ambient light. In this way, a depth map of one or more objects may be generated without having to first generate and direct an active light source or structured light to the one or more objects or having to perform a mechanical scan of the one or more objects. This may allow the electronic device to reduce architectural area with respect to its cameras and optical devices, to reduce costs, as well as to reduce an overall power consumption of the electronic device. Furthermore, the disclosed technology also enables the electronic device to maintain (full) resolution of its camera sensor(s).

FIG. 1 illustrates an example electronic device 100. In particular embodiments, the electronic device 100 may include, for example, any of various personal electronic devices 102, such as a mobile phone electronic device, a tablet computer electronic device, a laptop computer electronic device, and so forth. In particular embodiments, as further depicted by FIG. 1, the personal electronic device 102 may include, among other things, one or more processor(s) 104, memory 106, sensors 108, cameras 110, a display 112, input structures 114, network interfaces 116, a power source 118, and an input/output (I/O) interface 120. It should be noted that FIG. 1 is merely one example of a particular implementation and is intended to illustrate the types of components that may be included as part of the electronic device 100.

In particular embodiments, the one or more processor(s) 104 may be operably coupled with the memory 106 to perform various algorithms for generating a depth map based on incoherent digital holography. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the electronic device 100 to provide various functionalities. In particular embodiments, the sensors 108 may include, for example, one or more image sensors, touch sensors, microphones, motion detection sensors, thermal detection sensors, light detection sensors, time of flight (ToF) sensors, ultrasonic sensors, infrared sensors, or other similar sensors that may be utilized to detect various user inputs (e.g., user voice inputs, user gesture inputs, user touch inputs, user motion inputs, and so forth).

In particular embodiments, the cameras and optical devices 110 may include, for example, any number of front-facing or rear-facing cameras (e.g., wide cameras, narrow cameras, telephoto cameras, ultra-wide cameras, depth cameras, and so forth) that may be utilized to capture various 2D and 3D images. In particular embodiments, as will be further appreciated with respect to FIG. 2A, the cameras and optical devices 110 may also include, for example, one or more spatial light modulators (SLMs) (e.g., an electrically-addressed SLM, an optically-addressed SLM, and so forth) that may be utilized to modulate and/or phase-shift ambient light that may be detected by the one or more cameras 110. In particular embodiments, as will be further appreciated with respect to FIG. 2B, the cameras and optical devices 110 may also include, for example, one or more piezoelectric devices (e.g., including a planar mirror and a concave spherical mirror) spatial light modulators (SLMs) (e.g., an electrically-addressed SLM, an optically-addressed SLM, and so forth) that may be utilized to modulate and/or phase-shift ambient light that may be detected by the one or more cameras 110.

In particular embodiments, the display 112 may include any display architecture (e.g., AMLCD, AMOLED, micro-LED, and so forth), which may provide further means by which users may interact and engage with the electronic device 100. In particular embodiments, the input structures 114 may include any physical structures utilized to control one or more global functions of the electronic device 100 (e.g., pressing a button to power "ON" or power "OFF" the electronic device 100). The network interface 116 may include, for example, any number of network interfaces suitable for allowing the electronic device 100 to access and receive data over one or more cloud-based networks (e.g., a cloud-based service that may service hundreds or thousands of the electronic device 100 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the electronic device 100 for operation. Similarly, the I/O interface 120 may be provided to allow the electronic device 100 to interface with various other electronic or computing devices, such as one or more auxiliary electronic devices.

Figure 2A:
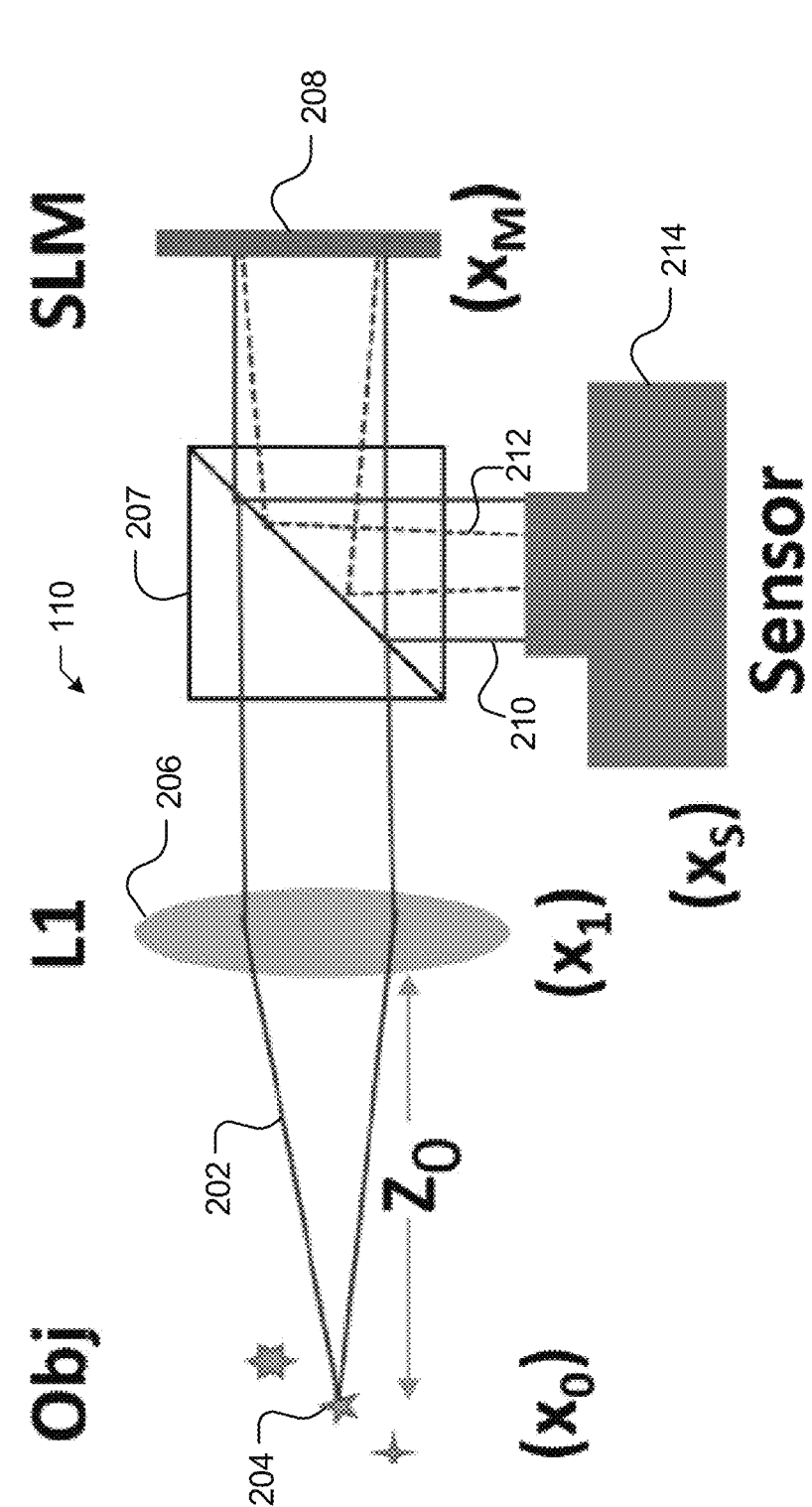
FIG. 2A illustrates an example depth map optical system, including a spatial light modulator (SLM).

FIG. 2A illustrates an example depth map optical system 200A, including an SLM, in accordance with presently disclosed embodiments. In particular embodiments, a light wave 202 may be reflected or scattered from a position of an object 204, and may propagate in a free space by a distance of $z_0$ before passing through a lens 206 and beam-splitter 207. In particular embodiments, the light wave 202 may then propagate a distance of $z_1$, and impinge upon, for example, a spatial light modulator (SLM) 208. In particular embodiments, the SLM 208 may include any device that may be suitable for modulating the phase distribution of the light wave 202. Specifically, in particular embodiments, a modulation pattern may be encoded onto the SLM 208, thus allowing the SLM 208 to split the light wave 202 into, for example, a planar light wave 210 and a spherical light wave 212.

For example, to generate the planar light wave 210, the SLM 208 may modulate the light wave 202 based on an encoded planar wavefront pattern. The planar light wave 210 may then propagate a distance $z_s$, and may be then detected by the image sensor 214. Similarly, to generate the spherical light wave 212, the SLM 208 may modulate the light wave 202 based on an encoded spherical wavefront pattern. The spherical light wave 212 may then propagate a distance $z_s$, and may be then detected by the image sensor 214. In particular embodiments, because light from a point source is spatially coherent, the planar light wave 210 and the spherical light wave 212 may interfere at the image sensor 214 to form one or more holograms (e.g., constituent interference patterns). In particular embodiments, the image sensor 214 may include, for example, a color sensor or a monochrome sensor with a bandpass color filter atop the monochrome sensor. In particular embodiments, when the position of the object 204 changes, for example, in the z direction in object 204 space, the spatial frequency of the interference pattern will change accordingly. Depth information may be encoded by the one or more holograms. For example, in particular embodiments, the lateral shift ($x_0$) in object 204 space is encoded into the lateral change of the interference pattern.

Figure 2B:
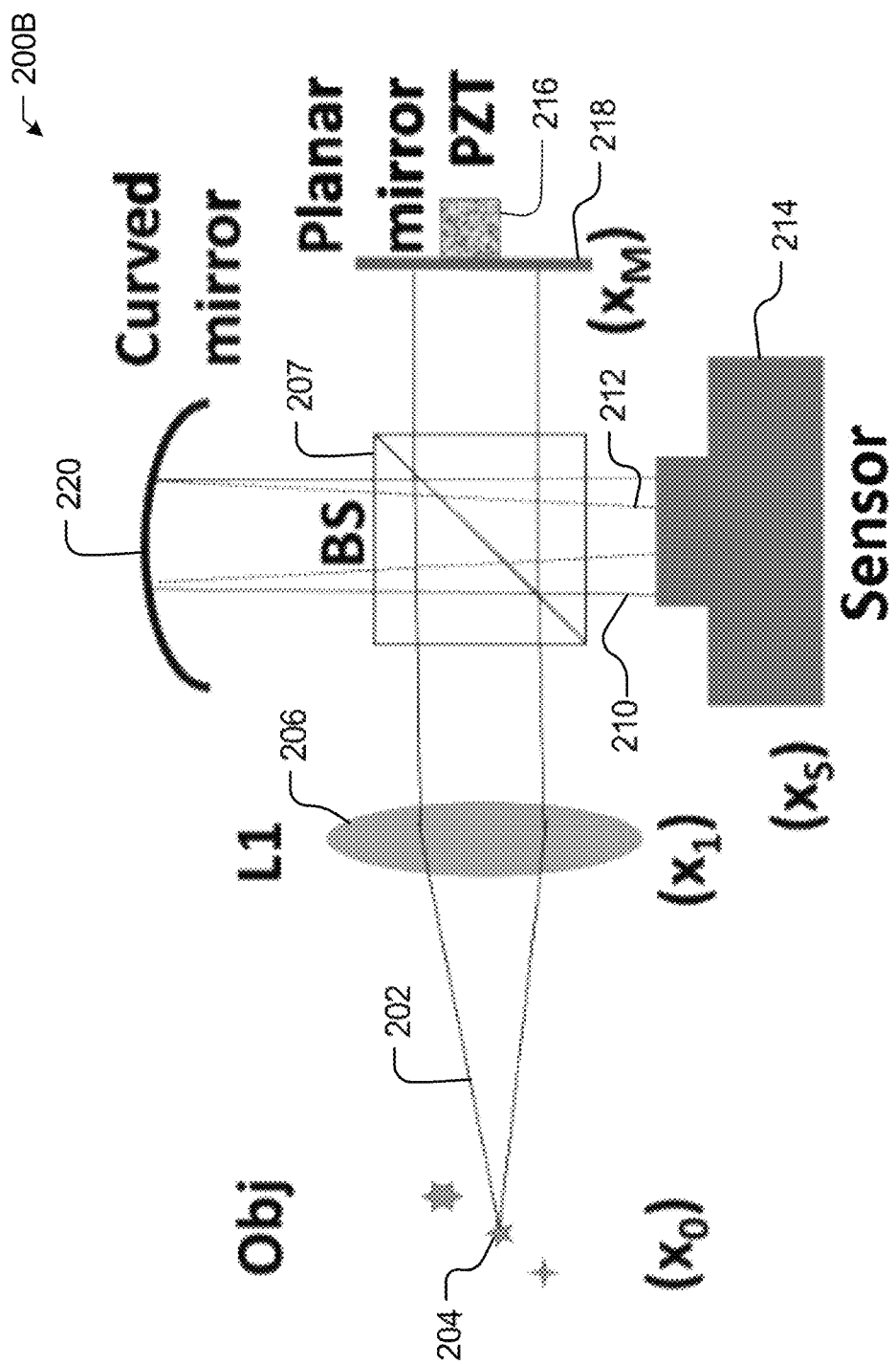
FIG. 2B illustrates an example depth map optical system, including a piezoelectric device.

FIG. 2B illustrates an example depth map optical system 200B, including a piezoelectric device, in accordance with presently disclosed embodiments. The optical system 200B may operate similar to the optical system 200A. However, instead of utilizing the SLM 208 to form the holograms, the optical system 200B may include a piezoelectric transducer (PZT) 216, which may include a planar mirror 218 that may be utilized to generate the planar light wave 210 and a curved (e.g., concave spherical) mirror 220 that may be utilized to generate a spherical light wave 212.

Figure 2C:
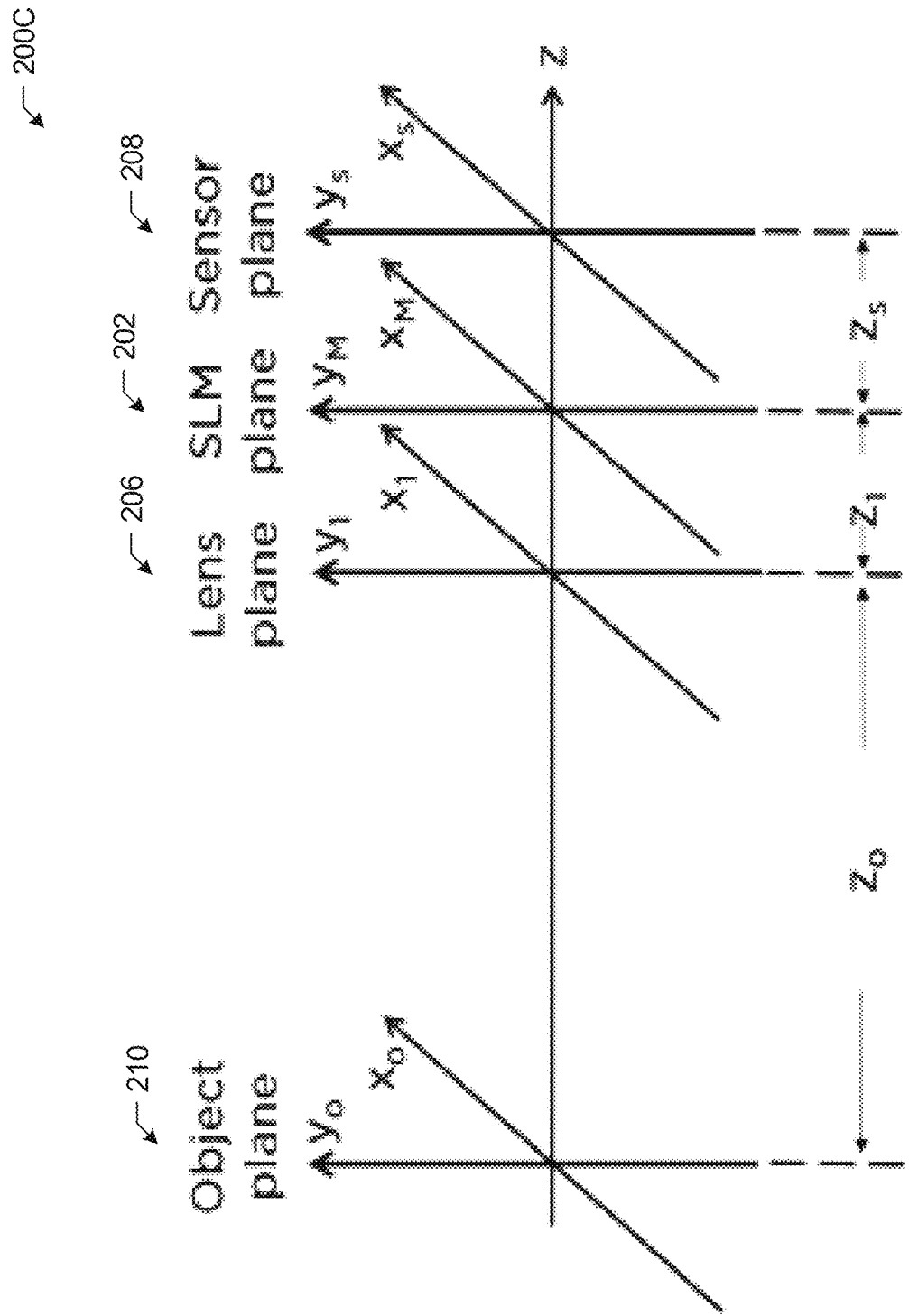
FIG. 2C illustrates an example reference coordinate system for performing incoherent digital holography.

FIG. 2C illustrates a reference coordinate system 200C by which the SLM 208 and/or PZT 212 may operate based thereon to perform incoherent digital holography, in accordance with presently disclosed embodiments. In particular embodiments, based on the reference coordinate system 200C, the SLM 208 may generate the planar light wave 210 and the spherical light wave 212, which may interfere at the image sensor 214 to form one or more holograms (e.g., phase-shifted holograms). For example, the light field at any point of the object 204 may be given by $O_0(x_0)$. After propagation of $z_0$ and going through the lens 206, under paraxial approximation, the output $O_1/(x_1)$ at lens 206 plane may be expressed as:

$$O_1(x_1) = O_0(x_0)\exp\left[\frac{j\pi}{\lambda z_0}(x_1 - x_0)^2\right]\exp\left[\frac{-j\pi}{\lambda f_1}x_1^2\right]. \quad \text{(Equation 1)}$$

In particular embodiments, $f_1$ is the focal length of lens 206 and is the central wavelength of the light wave 202. The light wave 202 then propagates by a distance $z_1$ to SLM 208, which serves as one or more mirrors and introduces a phase delay $\beta$. The light field after being modulated by the SLM 208, may propagate by $z_s$. Thus, the planar light wave 210 as detected by the image sensor 214 first copy of light field onto the sensor may be expressed as:

$$O_{s0}(x_s) = \exp[j\beta]\int O_1(x_1)\exp\left[\frac{j\pi}{\lambda(z_1+z_s)}(x_s-x_1)^2\right]dx_1 \quad \text{(Equation 2)}$$

$$= \exp[j\beta]O_0(x_0)\exp\left[\frac{j\pi}{\lambda z_0}x_0^2\right]\exp\left[\frac{j\pi}{\lambda(z_1+z_s)}x_s^2\right]$$

$$\exp\left[\frac{-j\pi\Delta}{\lambda}\left(\frac{x_0}{z_0}+\frac{x_s}{(z_1+z_s)}\right)^2\right]$$

$$= \exp[j\beta]O_{s1}(x_s),$$

$$\text{where } \frac{1}{\Delta} = \frac{1}{z_0}+\frac{1}{(z_1+z_s)}-\frac{1}{f_1}. \quad \text{(Equation 3)}$$

In particular embodiments, instead of providing a constant phase term, for generating the spherical light wave 212, a spherical wavefront modulation pattern is encoded on the SLM 208. The spherical light wave 212 generated by the SLM 208 may be expressed as:

$$O_M(x_M) = \exp\left[\frac{-j\pi}{\lambda f_M}x_M^2\right]O_0(x_0)\exp\left[\frac{j\pi}{\lambda z_0}x_0^2\right]\exp\left[\frac{j\pi}{\lambda z_1}x_M^2\right] \quad \text{(Equation 4)}$$

$$\int \exp\left[\frac{j\pi}{\lambda\Gamma}X_1^2\right]\exp\left[\frac{-j2\pi}{\lambda}\left(\frac{x_0}{z_0}+\frac{x_M}{z_1}\right)x_1\right]dx_1$$

$$= \exp\left[\frac{-j\pi}{\lambda f_M}x_M^2\right]O_0(x_0)\exp\left[\frac{j\pi}{\lambda z_0}x_0^2\right]\exp\left[\frac{j\pi}{\lambda z_1}x_M^2\right]$$

$$\exp\left[\frac{-j\pi\Gamma}{\lambda}\left(\frac{x_0}{z_0}+\frac{X_M}{z_1}\right)^2\right],$$

$$\text{where } \frac{1}{\Gamma} = \frac{1}{z_0}+\frac{1}{z_1}-\frac{1}{f_1}. \quad \text{(Equation 5)}$$

The spherical light wave 212 then propagates to the image sensors 214. The resultant light field becomes:

$$O_{s2}(x_s) = \int O_M(x_M)\exp\left[\frac{j\pi}{\lambda z_s}(x_s-x_M)^2\right]dx_M \quad \text{(Equation 6)}$$

$$= O_0(x_0)\exp\left[\frac{j\pi}{\lambda z_0}x_0^2\right]\int\exp\left[\frac{-j\pi}{\lambda f_M}x_M^2\right]\exp\left[\frac{j\pi}{\lambda z_1}x_M^2\right]$$

$$\exp\left[\frac{-j\pi\Gamma}{\lambda}\left(\frac{x_0}{z_0}+\frac{x_M}{z_1}\right)^2\right]\exp\left[\frac{j\pi}{\lambda z_s}(x_s-x_M)^2\right]dx_M$$

$$= O_0(x_0)\exp\left[\frac{j\pi}{\lambda z_0}x_0^2\right]\exp\left[\frac{j\pi\Gamma}{\lambda z_0^2}x_0^2\right]\exp\left[\frac{j\pi}{\lambda z_s}x_s^2\right]$$

$$\exp\left[\frac{-j\pi\Omega}{\lambda}\left(\frac{\Gamma x_0}{z_0 z_1}+\frac{x_s}{z_s}\right)^2\right],$$

$$\text{where } \frac{1}{\Omega} = \frac{-1}{f_M}+\frac{1}{z_1}+\frac{-\Gamma}{z_1^2}+\frac{1}{z_s}. \quad \text{(Equation 7)}$$

For this one single object 204 point, the hologram may be given by coherent addition:

$$H_s(x_s, x_0, \beta) = |O_{s0}+O_{s2}|^2 \quad \text{(Equation 8)}$$

$$= |O_{s1}|^2+|O_{s2}|^2+\exp(-j\beta)O_{s1}^*O_{s2}+$$

$$\exp(j\beta)O_{s1}O_{s2}^*.$$

For an extended object, the hologram may be an incoherent addition or summation of the holograms from each object 204. This may be expressed as:

$$H_{ext}(x_s, \beta) = \int H_{sg}(x_s, x_0, \beta)dx_0 \quad \text{(Equation 9)}$$

$$= \int[|O_{s1}|^2+|O_{s2}|^2+\exp(-j\beta)O_{s1}^*O_{s2}+$$

$$\exp(j\beta)O_{s1}O_{s2}^*]dx_0.$$

To extract the third term, a phase shift is applied by setting $\beta$ to 0, $\pi/2$, $\pi$, and $3\pi/2$ respectively. The third term extraction may be expressed as:

$$H_C(x_s) = \frac{1}{4}\{[H_{ext}(x_s, 0) - H_{ext}(x_s, \pi)]+ \quad \text{(Equation 10)}$$

$$j[H_{ext}(x_s, \pi/2) - H_{ext}(x_s, 3\pi/2)]\}$$

$$= \int O_{s1}^*O_{s2}dx_0.$$

After this phase shifting process, the cross term may be expressed as:

$$O_{s1}^*O_{s2} = \exp\left[\frac{j\pi\Gamma}{\lambda z_0^2}x_0^2\right]|O_0(x_0)|^2\exp\left[\frac{j\pi}{\lambda}\left(\frac{z_1}{z_s(z_1+z_s)}\right)x_s^2\right] \quad \text{(Equation 11)}$$

$$\exp\left[\frac{j\pi}{\lambda}\left(\frac{\Delta}{(z_1+z_s)^2}\right)x_s^2\right]\exp\left[\frac{-j\pi}{\lambda}\left(\frac{\Omega}{z_s^2}\right)x_s^2\right]$$

$$\exp\left[\frac{j\pi}{\lambda}\left(\frac{\Delta}{z_0^2}\right)x_0^2\right]\exp\left[\frac{-j\pi}{\lambda}\left(\frac{\Omega\Gamma^2}{z_0^2 z_1^2}\right)x_0^2\right]$$

$$\exp\left[\frac{j2\pi}{\lambda}\left(\frac{\Delta}{z_0(z_1+z_s)}-\frac{\Omega\Gamma}{z_0 z_1 z_s}\right)x_0 x_s\right].$$

To simplify the expression, length quantities P and Q may be defined as:

$$\frac{1}{P} = \frac{z_1}{z_s(z_1+z_s)}+\left(\frac{\Delta}{(z_1+z_s)^2}\right)-\left(\frac{\Omega}{z_s^2}\right); \text{ and} \quad \text{(Equation 12)}$$

$$\frac{1}{Q} = -\frac{\Delta}{z_0(z_1+z_s)}+\frac{\Omega\Gamma}{z_0 z_1 z_s}. \quad \text{(Equation 13)}$$

Plugging (Equation 12) and (Equation 13) into (Equation 11), the expression becomes:

$$O_{s1}^* O_{s2} = \exp\left[\frac{j\pi\Gamma}{\lambda z_0^2} x_0^2\right] |O_0(x_0)|^2 \exp\left[\frac{j\pi}{\lambda}\left(\frac{z_1}{z_s(z_1 + z_s)}\right) x_s^2\right] \quad \text{(Equation 14)}$$

$$\exp\left[\frac{j\pi}{\lambda}\left(\frac{\Delta}{(z_1 + z_s)^2}\right) x_s^2\right] \exp\left[\frac{-j\pi}{\lambda}\left(\frac{\Omega}{z_s^2}\right) x_s^2\right]$$

$$\exp\left[\frac{j\pi}{\lambda}\left(\frac{\Delta}{z_0^2}\right) x_0^2\right] \exp\left[\frac{-j\pi}{\lambda}\left(\frac{\Omega\Gamma^2}{z_0^2 z_1^2}\right) x_0^2\right]$$

$$\exp\left[\frac{j2\pi}{\lambda}\left(\frac{\Delta}{z_0(z_1 + z_s)} - \frac{\Omega\Gamma}{z_0 z_1 z_s}\right) x_0 x_s\right]$$

$$= \exp\left[\frac{j\pi}{\lambda}\left(\frac{\Gamma}{z_0^2} + \frac{\Delta}{z_0^2} - \frac{\Omega\Gamma^2}{z_0^2 z_1^2} - \frac{P}{Q^2}\right) x_0^2\right]$$

$$|O_0(x_0)| \exp\left[\frac{j\pi}{\lambda P}\left(x_s - \frac{P}{Q} x_0\right)^2\right].$$

In particular embodiments, for the extended object 204, the complex hologram may be expressed as:

$$H(x_s) = \int O_{s1}^* O_{s2} dx_0 \quad \text{(Equation 15)}$$

$$= \int \exp\left[\frac{j\pi}{\lambda}\left(\frac{\Gamma}{z_0^2} + \frac{\Delta}{z_0^2} - \frac{\Omega\Gamma^2}{z_0^2 z_1^2} - \frac{P}{Q^2}\right) x_0^2\right]$$

$$|O_0(x_0)|^2 \exp\left[\frac{j\pi}{\lambda P}\left(x_s - \frac{P}{Q} x_0\right)^2\right] dx_0.$$

In particular embodiments, to reconstruct the object 204 intensity $I(x_0)$, the complex hologram is propagated by a distance $-P$ and the modulus is taken. The intensity $I(x_0)$ may be then expressed as:

$$I_r(x_r) = \left| \int H(x_s) \exp\left[\frac{-j\pi}{\lambda P}(x_r - x_s)^2\right] dx_s \right| \quad \text{(Equation 16)}$$

$$= \left| \exp\left[\frac{-j\pi}{\lambda P} x_r^2\right] \exp\left[\frac{j\pi}{\lambda} \frac{P}{Q^2}\left(\frac{Q x_r}{P}\right)^2\right] I_0\left(\frac{Q x_r}{P}\right) \right|$$

$$= I_0\left(\frac{Q x_r}{P}\right).$$

In particular embodiments, the reconstruction distance $d_r$ may be expressed as:

$$d_r = -P = \frac{-1}{\frac{z_1}{z_s(z_1 + z_s)} + \left(\frac{\Delta}{(z_1 + z_s)^2}\right) - \left(\frac{\Omega}{z_s^2}\right)}, \quad \text{(Equation 17)}$$

where:

$$\frac{1}{\Delta} = \frac{1}{z_0} + \frac{1}{(z_1 + z_s)} - \frac{1}{f_1}; \quad \text{(Equation 18)}$$

$$\frac{1}{\Omega} = \frac{-1}{f_M} + \frac{1}{z_1} + \frac{-\Gamma}{z_1^2} + \frac{1}{z_s}; \text{ and}$$

$$\frac{1}{\Gamma} = \frac{1}{z_0} + \frac{1}{z_1} - \frac{1}{f_1}.$$

In particular embodiments, based on (Equation 17) and (Equation 18), for given optical parameters, $d_r$ is solely determined by the actual object 204 position $z_0$ (e.g., depth value). On the other hand, if $d_r$ is known, $z_0$ may be determined based on (Equation 17) and (Equation 18).

Figure 3:
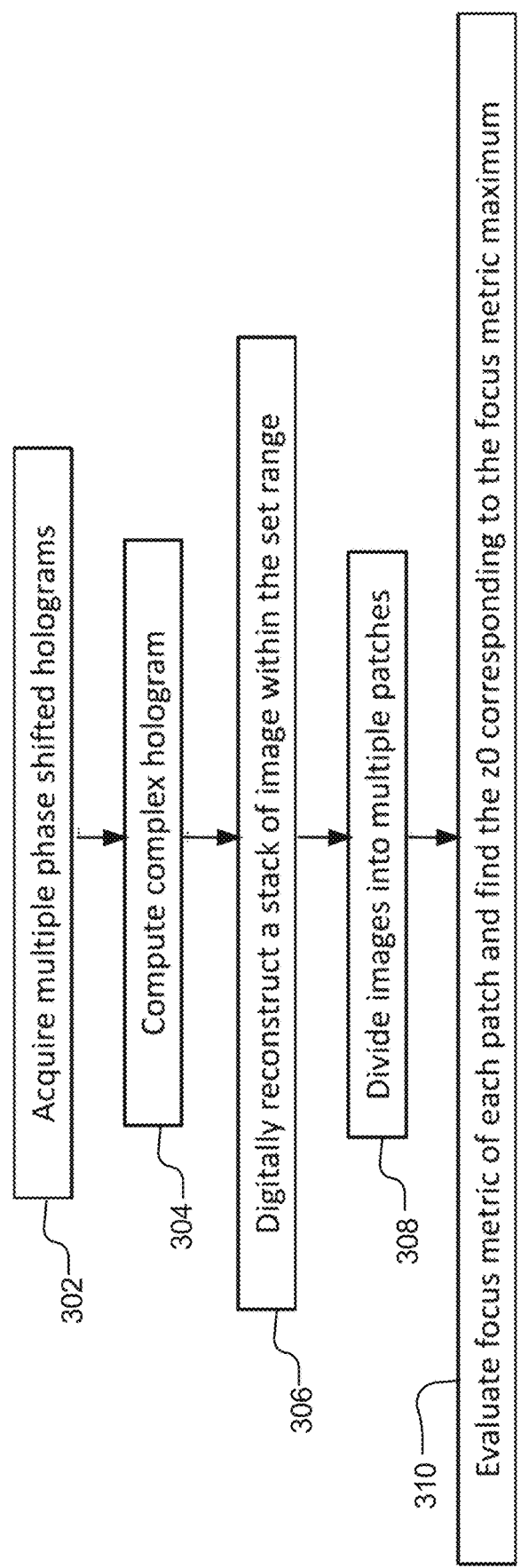
FIG. 3 illustrates a flow diagram for performing a depth map generation and extraction.

FIG. 3 illustrates a flow diagram 300 for performing a depth map extraction, in accordance with the presently disclosed embodiments. For the purpose of illustration, FIG. 3 may be described, at least in some instances, in conjunction with FIGS. 4A, 4B, 4C, and 4D. Specifically, FIG. 3 illustrates a flow diagram for performing a depth map generation and extraction, while FIGS. 4A, 4B, 4C, and 4D illustrate respective diagrams 400A, 400B, 400C, and 400D of examples of the depth map generation and extraction. The method 300 may be performed utilizing one or more processing devices (e.g., electronic device 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

In particular embodiments, the electronic device 100 may determine (at block 302) an intensity and a phase of object 204 field at the image sensor 214 or a complex function (e.g., complex hologram) from one or more objects 204 based on a number of holograms. For example, referring to FIG. 4A, the electronic device 100 may generate holograms 402, 404, 406, and 408 with respective phase shifts of 0 radians (e.g., 0°), π/2 radians (e.g., 90°), π radians (e.g., 180°), and 3π/2 radians (e.g., 270°). In particular embodiments, the electronic device 100 may generate (at block 304) a complex function corresponding to the number of phase-shifted holograms. For example, referring to again to FIG. 4A based on (Equation 10) above, the electronic device 100 generate the complex hologram, which may be illustrated by the complex hologram intensity map 410A and complex hologram phase map 410B of FIG. 4A. The complex hologram intensity map 410A and complex hologram phase map 410B may correspond to (Equation 15) above. Returning to FIG. 3, in particular embodiments, for each object of the one or more objects, the electronic device 100 may determine (306) a first reconstruction distance based at least in part on a position of the object or the complex hologram, determine a range between the first reconstruction distance and the position of the object, and numerically or digitally refocus a set of image frames of the object at a number of different reconstruction distances within the range.

For example, in particular embodiments, the electronic device 100 may numerically or digitally refocus reconstruction distance $d_r$ in a range defined based on $z_0$ and $d_r$, and determine a series of reconstructed intensity $I_r(x_r, y_r, d_r)$ values at different reconstruction distances $d_r$. In particular embodiments, the electronic device 100 may then divide (block 308) each of the set of image frames into a number of image patches, and may then determine a particular reconstruction distance of the number of different reconstruction distances. In particular embodiments, the particular reconstruction distance $d_r$ may correspond to a maximizing (at block 310) of a focus evaluation function corresponding to one or more of the number of image patches. In particular embodiments, the electronic device 100 may then determine (at block 310) a depth value associated with the object based at least in part on a look-up table including $z_0$ and $d_r$ correlations, in which the depth value may correspond to the particular reconstruction distance. In particular embodiments, the electronic device 100 may then assign the depth value to the one or more of the number of image patches to generate the depth map.

Figure 4A:
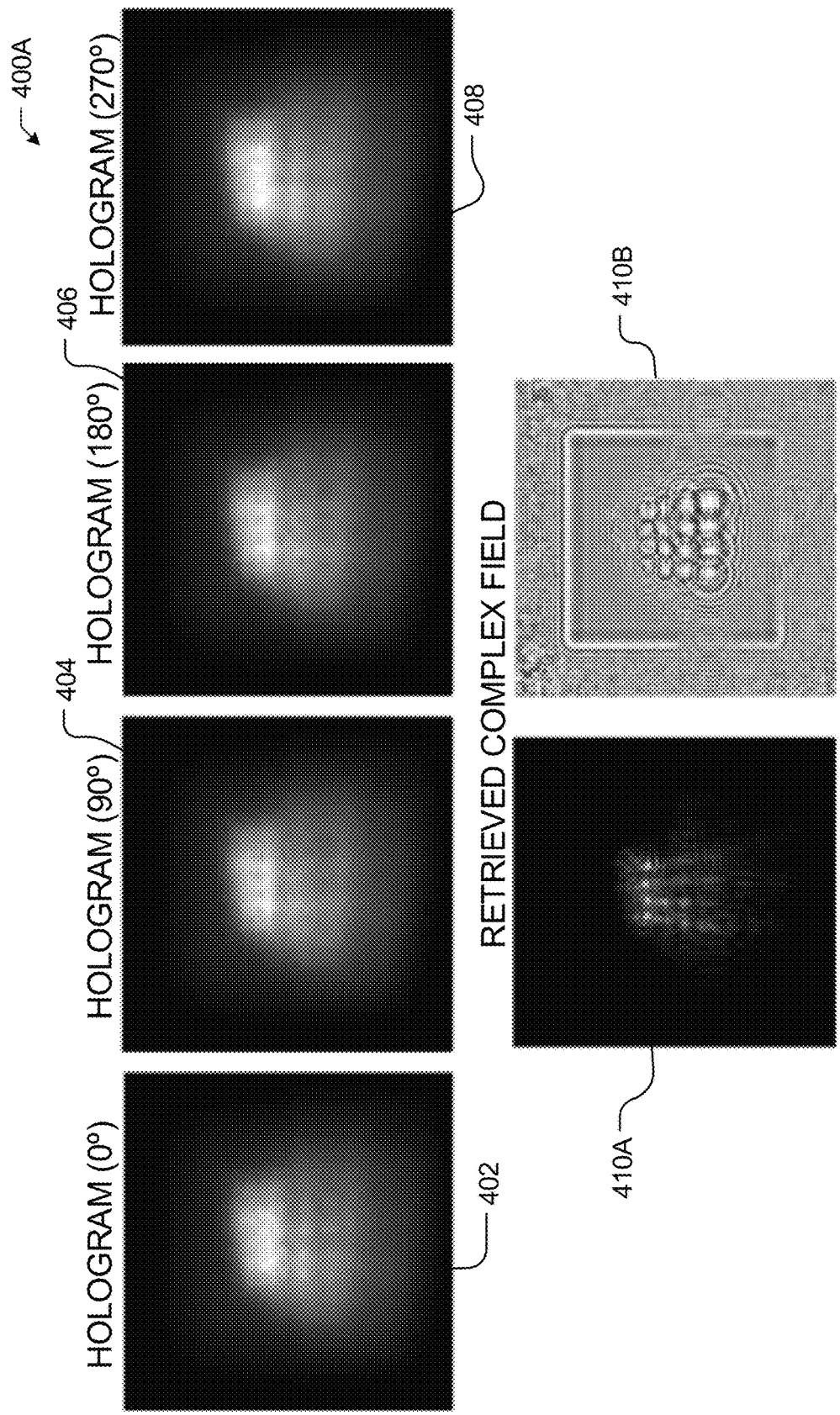
FIGS. 4A, 4B, 4C, and 4D illustrate diagrams of examples of performing a depth map generation and extraction.
Figure 4B:
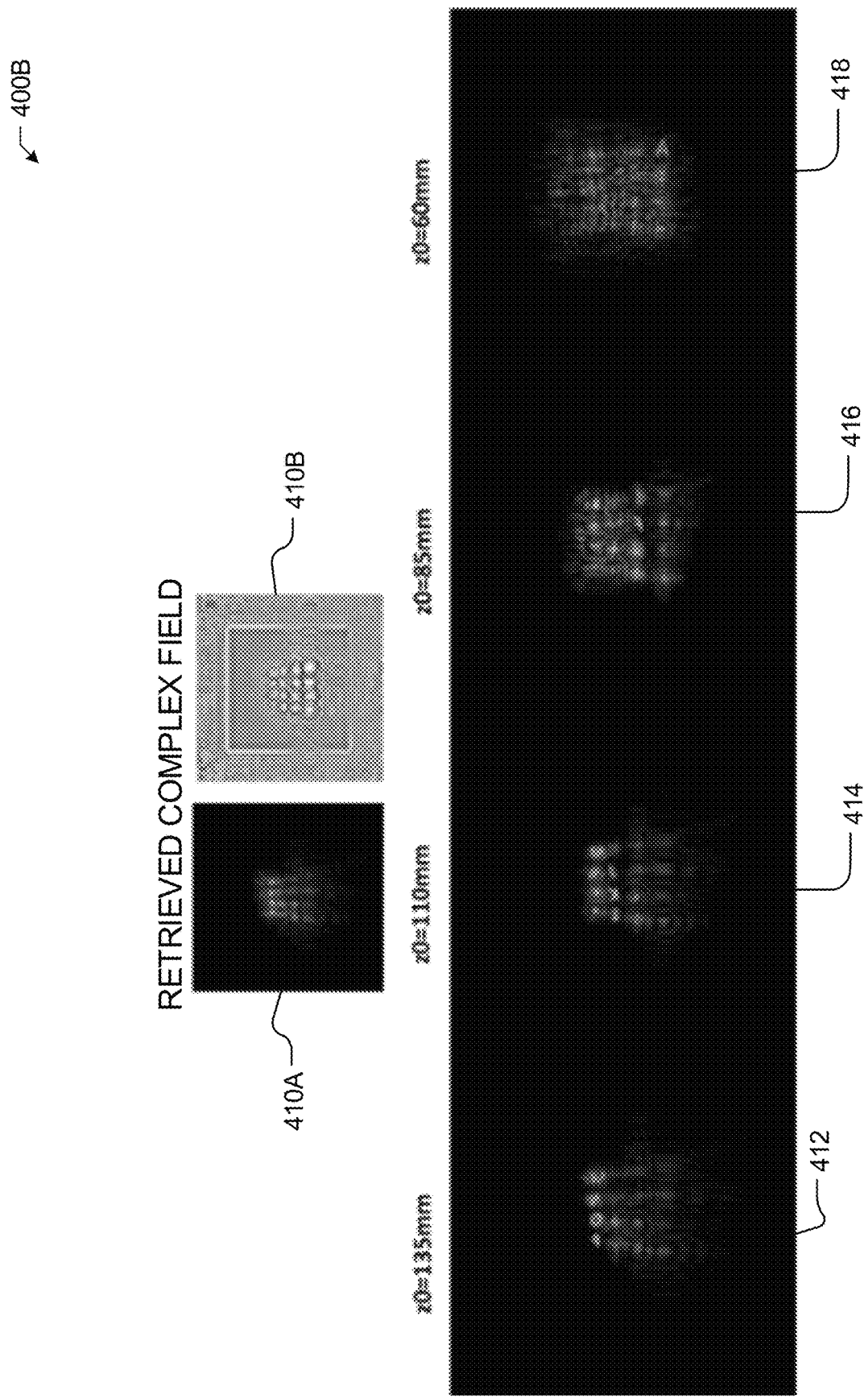
Figure 4C:
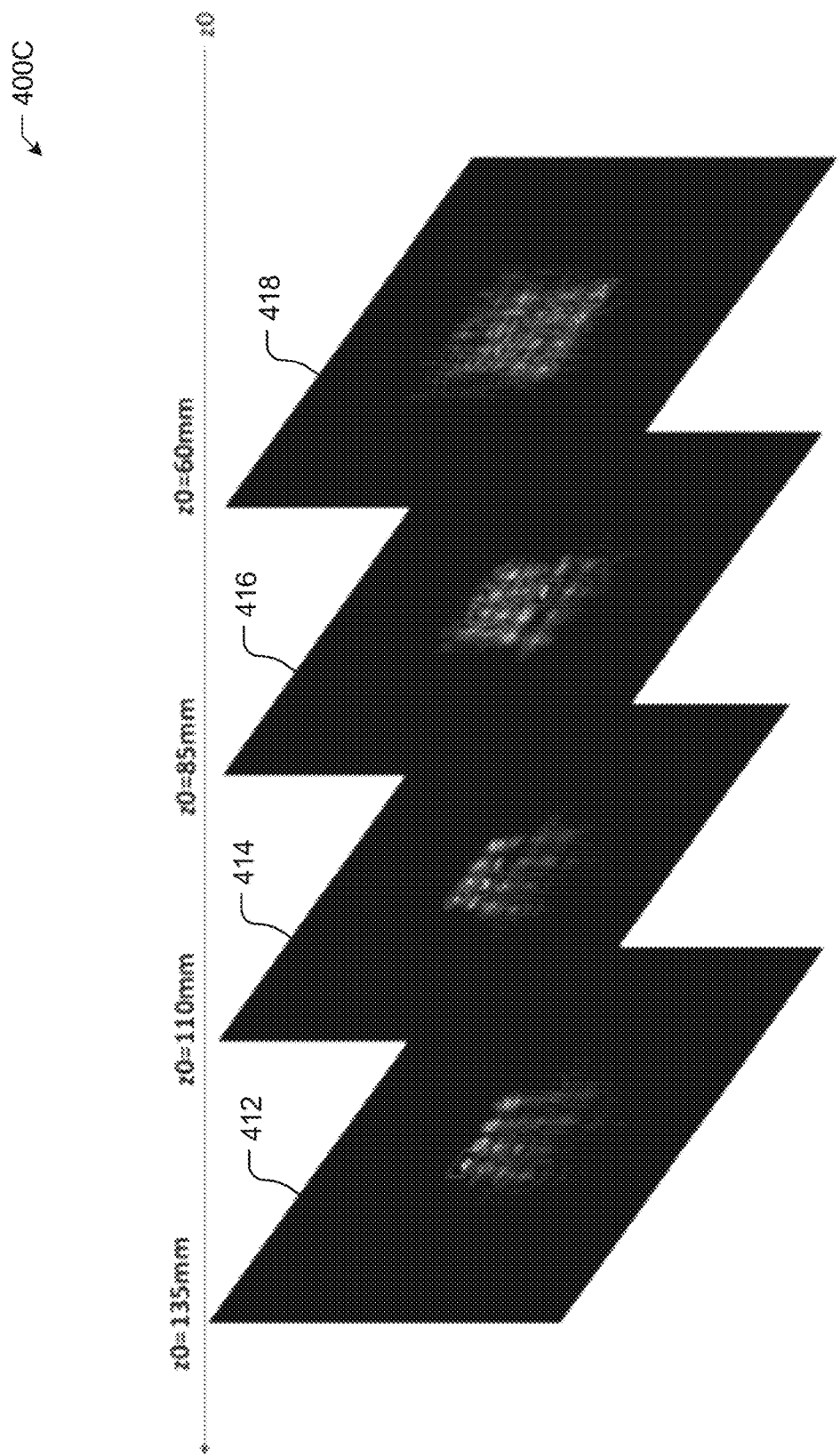
Figure 4D:
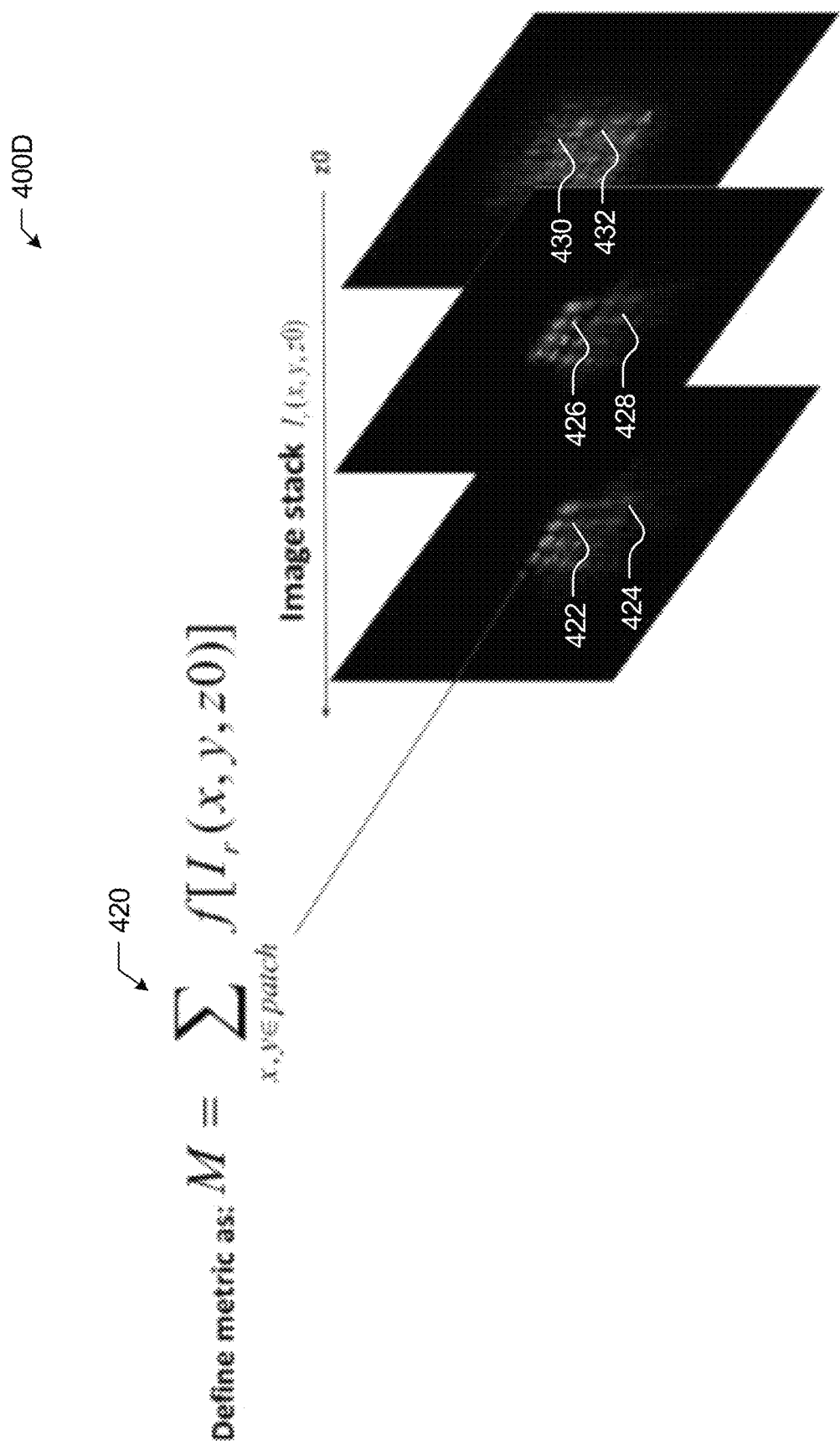

For example, referring to FIGS. 4B and 4C, based on (Equation 16), the electronic device 100 may numerically or digitally refocus a set of image frames 412, 414, 416, and 418 of the object at a number of different reconstruction distances $d_r$=750 millimeter (mm), $d_r$=424 mm, $d_r$=237 mm, and $d_r$=127 mm. These reconstruction distances $d_r$ may correspond to, for example, depth values $z_0$=60 mm, $z_0$=85 mm, $z_0$=110 mm, and $z_0$=135 mm, respectively. Specifically, referring to FIG. 4D, the electronic device 100 may evaluate a focus evaluation function 420 of the reconstructed intensity $I_r(x_r, y_r, d_r)$ of different image patches 422, 424, 426, 428, 430, and 432, for example. In particular embodiments, the focus evaluation function 420 may be expressed as:

$$M = \sum_{x_r, y_r \in patch} [I_r(x_r, y_r, d_r)]^{2.3}.$$ (Equation 19)

Accordingly, the reconstruction distance $d_r$ that corresponds to the maximum M of the focus evaluation function 420 is the one in which is utilized to obtain the depth $z_0$ based on a look-up table including $z_0$ and $d_r$ correlations. Thus, the present techniques may utilize incoherent digital holography to generate a depth map based on ambient light. In this way, a depth map of one or more objects may be generated without having to first generate and direct an active light source or structured light to the one or more objects or having to perform a mechanical scan of the one or more objects. This may allow the electronic device 100 to reduce architectural area with respect to its cameras and optical devices 110, as well as to reduce an overall power consumption of the electronic device 100.

Figure 5:
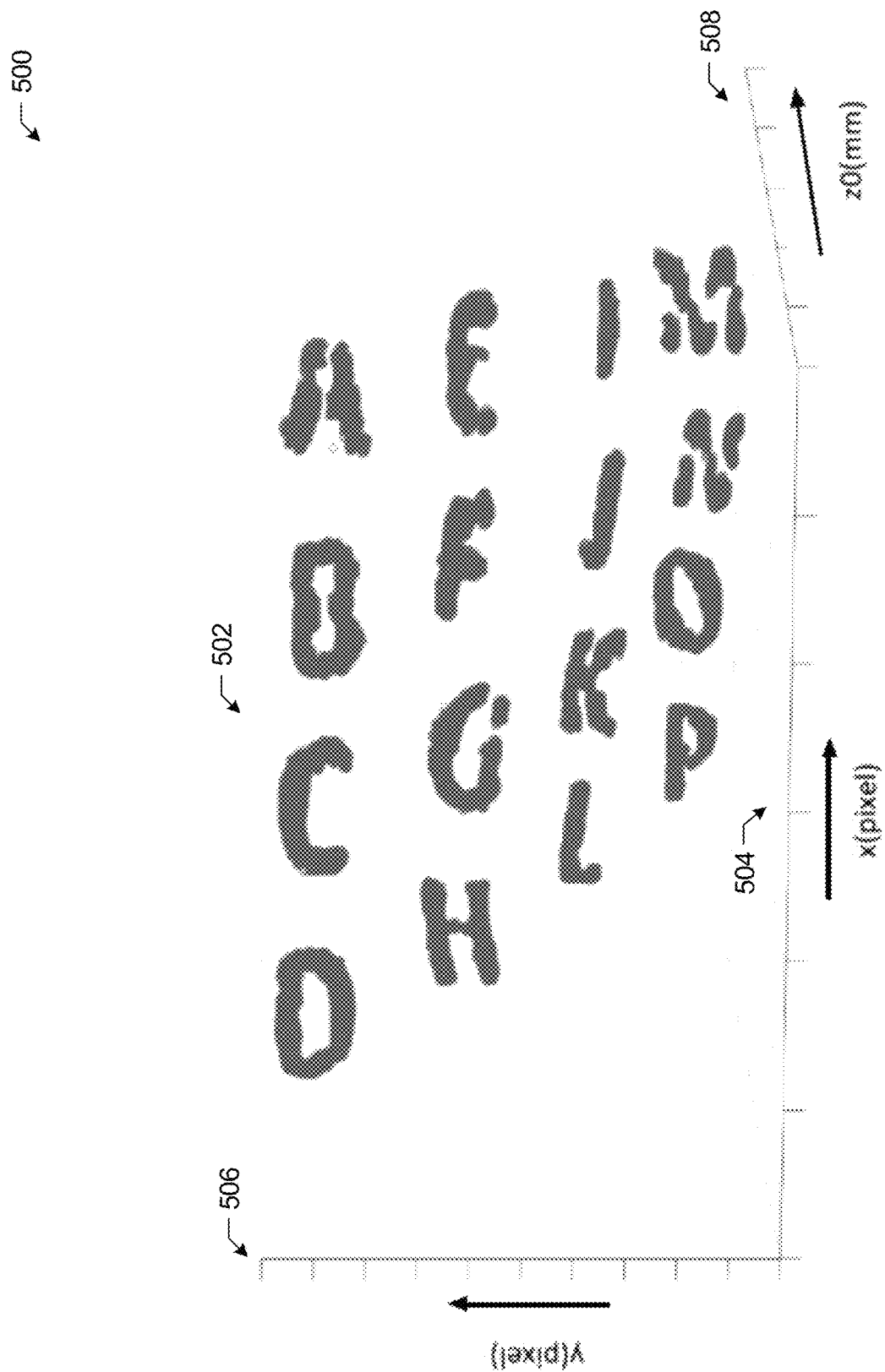
FIG. 5 illustrates a diagram of an example of generated and extracted depth map.

FIG. 5 illustrates a diagram 500 of an example of generated and extracted depth map, in accordance with the presently disclosed embodiments. As depicted, a depth map 502, including an x-axis 404, a y-axis 406, and z-axis 408, may illustrate a 3D reconstruction of 16 alphabets, in which one or more of the 16 alphabets are displayed at different depths with respect to each other. In particular embodiments, the depth map 502 may represent a real-world simulation of the incoherent digital holography based depth map generation techniques as presently disclosed herein.

Figure 6:
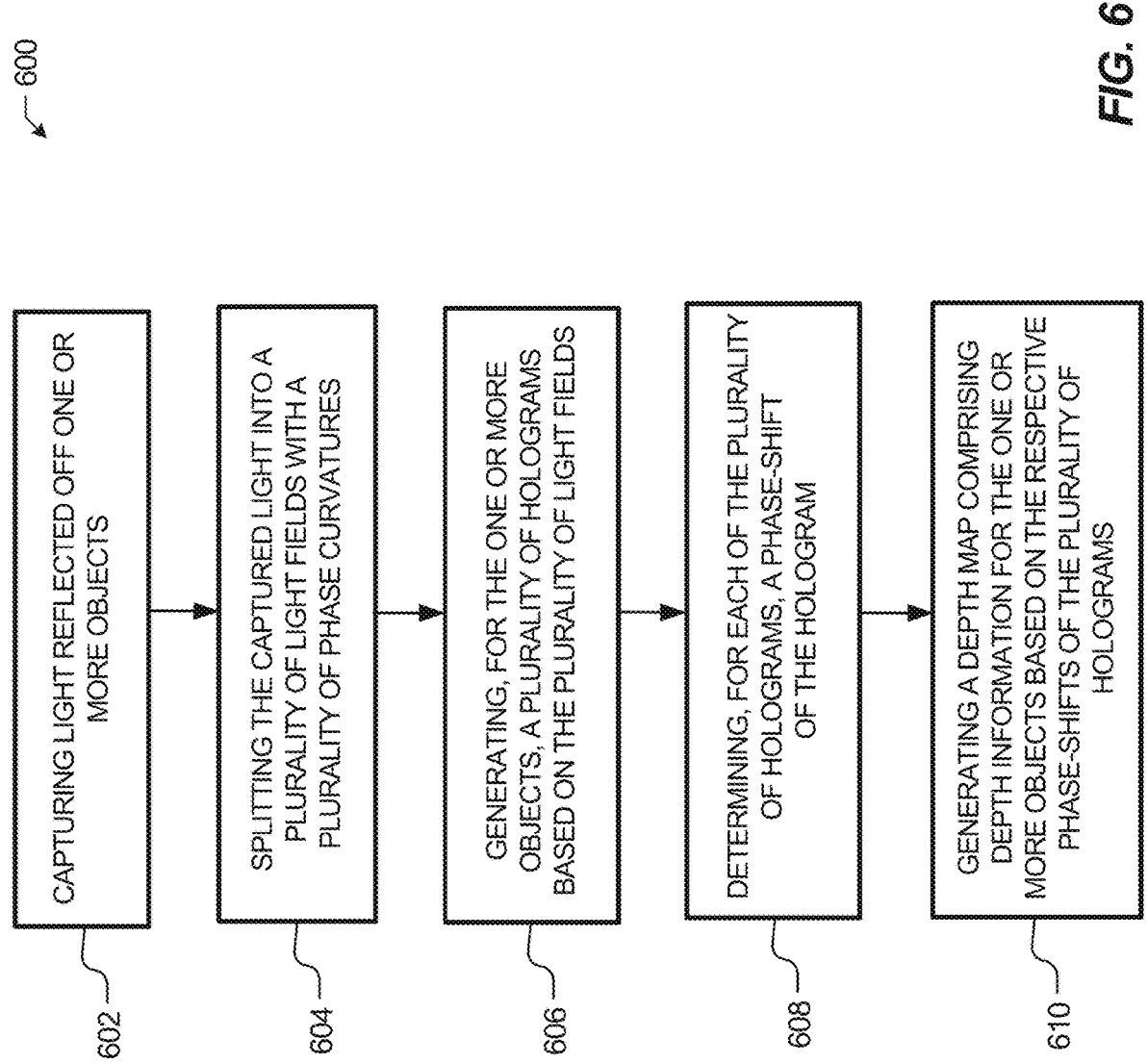
FIG. 6 illustrates a flow diagram of a method for generating a depth map based on incoherent digital holography.

FIG. 6 illustrates is a flow diagram of a method 600 for generating a depth map based on incoherent digital holography, in accordance with the presently disclosed embodiments. The method 600 may be performed utilizing one or more processing devices (e.g., electronic device 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 600 may begin block 602 with the one or more processing devices (e.g., electronic device 100) capturing light reflected off one or more objects. In particular embodiments, the electronic device 100 may capture ambient light reflected off one or more objects. The method 600 may then continue at block 604 with the one or more processing devices (e.g., electronic device 100) splitting the captured light into a plurality of light fields with a plurality of phase curvatures. In particular embodiments, the electronic device 100 may split the captured light into the plurality of light fields by utilizing a spatial light modulator (SLM) of the electronic device. In particular embodiments, the SLM may split the captured light into a planar light wave and a spherical light wave. The method 600 may then continue at block 606 with the one or more processing devices (e.g., electronic device 100) generating, for the one or more objects, a plurality of holograms based on the plurality of light fields. In particular embodiments, the electronic device 100 may generate, for each object of the one or more objects, a plurality of phase-shifted holograms, in which each phase-shifted hologram may include a phase shift of π/2 radians (e.g., 90°) with respect to each other.

The method 600 may then continue at block 608 with the one or more processing devices (e.g., electronic device 100) determining, for each of the plurality of holograms, an intensity and a phase-shift of the hologram. The method 600 may then conclude at block with the one or more processing devices (e.g., electronic device 100) generating a depth map comprising depth information for the one or more objects based at least in part on a function determined by the respective phase-shifts of the plurality of holograms. Thus, the present techniques may utilize incoherent digital holography to generate a depth map based on ambient light. In this way, a depth map of one or more objects may be generated without having to first generate and direct an active light source or structured light to the one or more objects or having to perform a mechanical scan of the one or more objects. This may allow the electronic device 100 to reduce architectural area with respect to its cameras and optical devices 110, as well as to reduce an overall power consumption of the electronic device 100.

Figure 7:
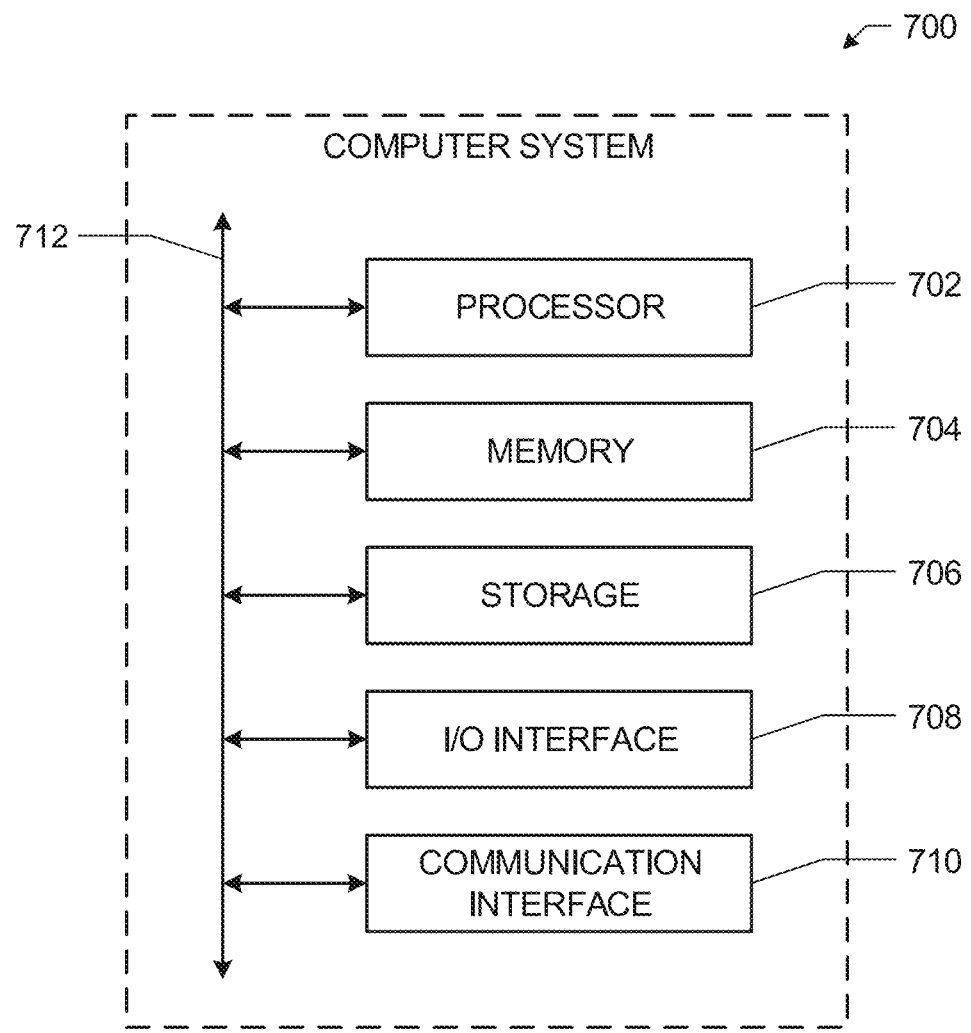
FIG. 7 illustrates an example computer system.

FIG. 7 illustrates an example computer system 700 that may be utilized for generating a depth map based on incoherent digital holography, in accordance with the presently disclosed embodiments. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks.

Where appropriate, one or more computer systems 700 may perform without substantial spatial or temporal limitation one or more steps of one or more methods described or illustrated herein. As an example, and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example, and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example, and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example, and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere).

One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example, and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 706 for them. Where appropriate, I/O interface 708 may include one or more device or software drivers enabling processor 702 to drive one or more of these I/O devices. I/O interface 708 may include one or more I/O interfaces 706, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it.

As an example, and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example, and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, may be claimed in another claim category, e.g. system, as well. The dependencies or references back in the attached claims are chosen for formal reasons only. However, any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electronic device:
capturing ambient light reflected off one or more objects, wherein the ambient light comprises non-laser light;
splitting the captured ambient light reflected off the one or more objects into a plurality of light fields with a plurality of phase curvatures;
generating, for the one or more objects, a plurality of holograms based on the plurality of light fields;
determining, for each of the plurality of holograms, an intensity and a phase-shift of the hologram; and
generating, for the one or more objects, a depth map comprising depth information for the one or more objects based on a reconstruction of the plurality of holograms, wherein the plurality of holograms are reconstructed based at least in part on a function determined by the respective intensities and phase-shifts of the plurality of holograms.

2. The method of claim 1, wherein splitting the captured ambient light into the plurality of light fields comprises splitting, by a spatial light modulator (SLM) of the electronic device, the captured light into a planar light wave and a spherical light wave.

3. The method of claim 1, wherein the plurality of holograms comprises, for each object of the one or more objects, a plurality of phase-shifted holograms corresponding to the respective object.

4. The method of claim 3, wherein the function determined by the respective phase-shifts of the plurality of holograms comprises a complex function corresponding to the plurality of phase-shifted holograms.

5. The method of claim 4, further comprising, for each object of the one or more objects:
determining a first reconstruction distance based at least in part on a position of the object or the complex function;
determining a range between the first reconstruction distance and the position;
numerically refocusing a set of image frames of the object at a plurality of different reconstruction distances within the range; and
generating a look-up table based on the position and the plurality of different reconstruction distances.

6. The method of claim 5, further comprising, for each object of the one or more objects:
dividing each of the set of image frames into a plurality of image patches; and
determining a particular reconstruction distance of the plurality of different reconstruction distances, wherein the particular reconstruction distance corresponds to a maximizing of a focus evaluation function corresponding to one or more of the plurality of image patches.

7. The method of claim 6, further comprising, for each object of the one or more objects:
determining a depth value associated with the object based at least in part on the look-up table, wherein the depth value corresponds to the particular reconstruction distance; and
assigning the depth value to the one or more of the plurality of image patches to generate the depth map.

8. An electronic device comprising:
one or more cameras;
one or more non-transitory computer-readable storage media including instructions; and
one or more processors coupled to the storage media and the one or more cameras, the one or more processors configured to execute the instructions to:
capture ambient light reflected off one or more objects, wherein the ambient light comprises non-laser light;
split the captured ambient light reflected off the one or more objects into a plurality of light fields with a plurality of phase curvatures;
generate, for the one or more objects, a plurality of holograms based on the plurality of light fields;
determine, for each of the plurality of holograms, an intensity and a phase-shift of the hologram; and
generate, for the one or more objects, a depth map comprising depth information for the one or more objects based on a reconstruction of the plurality of holograms, wherein the plurality of holograms are reconstructed based at least in part on a function determined by the respective intensities and phase-shifts of the plurality of holograms.

9. The electronic device of claim 8, wherein the electronic device further comprises a spatial light modulator (SLM), and wherein the instructions to split the captured ambient light into the plurality of light fields comprise instructions to split, by the SLM, the captured light into a planar light wave and a spherical light wave.

10. The electronic device of claim 8, wherein the electronic device further comprises a piezoelectric transducer (PZT), and wherein the PZT comprises a planar mirror configured to generate a planar light wave and a concave spherical mirror configured to generate a spherical light wave.

11. The electronic device of claim 8, wherein the plurality of holograms comprises, for each object of the one or more objects, a plurality of phase-shifted holograms corresponding to the respective object.

12. The electronic device of claim 11, wherein the function determined by the respective phase-shifts of the plurality of holograms comprises a complex function corresponding to the plurality of phase-shifted holograms.

13. The electronic device of claim 12, wherein, for each object of the one or more objects, the instructions further comprise instructions to:
determine a first reconstruction distance based at least in part on a position of each of the one or more objects or the complex function;
determine a range between the first reconstruction distance and the position;
numerically refocus a set of image frames of the one or more objects at a plurality of different reconstruction distances within the range; and
generate a look-up table based on the position and the plurality of different reconstruction distances.

14. The electronic device of claim 13, wherein, for each object of the one or more objects, the instructions further comprise instructions to:
divide each of the set of image frames into a plurality of image patches; and
determine a particular reconstruction distance of the plurality of different reconstruction distances, wherein the particular reconstruction distance corresponds to a maximizing of a focus evaluation function corresponding to one or more of the plurality of image patches.

15. The electronic device of claim 14, wherein, for each object of the one or more objects, the instructions further comprise instructions to:
determine a depth value associated with the one or more objects based at least in part on the look-up table, wherein the depth value corresponds to the particular reconstruction distance; and assign the depth value to the one or more of the plurality of image patches to generate the depth map.

16. A non-transitory computer-readable medium comprising instructions that, when executed by one or more processors of an electronic device, cause the one or more processors to:

capture ambient light reflected off one or more objects, wherein the ambient light comprises non-laser light;

split the captured ambient light reflected off the one or more objects into a plurality of light fields with a plurality of phase curvatures;

generate, for the one or more objects, a plurality of holograms based on the plurality of light fields;

determine, for each of the plurality of holograms, an intensity and a phase-shift of the hologram; and generate, for the one or more objects, a depth map comprising depth information for the one or more objects based on a reconstruction of the plurality of holograms, wherein the plurality of holograms are reconstructed based at least in part on a function determined by the respective intensities and phase-shifts of the plurality of holograms.

17. The non-transitory computer-readable medium of claim 16, wherein the instructions to split the captured ambient light into the plurality of light fields comprise instructions to split, by a spatial light modulator (SLM) of the electronic device, the captured light into a planar light wave and a spherical light wave.

* * * * *